United States Patent
Klingel

(10) Patent No.: US 6,715,327 B2
(45) Date of Patent: Apr. 6, 2004

(54) METHOD AND DEVICE FOR TREATING EDGES IN A HIGH PRESSURE FUEL ACCUMULATOR

(75) Inventor: Markus Klingel, Grossglattbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/048,879

(22) PCT Filed: May 3, 2001

(86) PCT No.: PCT/DE01/01681
§ 371 (c)(1),
(2), (4) Date: Apr. 25, 2002

(87) PCT Pub. No.: WO01/92716
PCT Pub. Date: Dec. 6, 2001

(65) Prior Publication Data
US 2002/0134354 A1 Sep. 26, 2002

(30) Foreign Application Priority Data
Jun. 2, 2000 (DE) .......................................... 100 27 364

(51) Int. Cl.⁷ ............................ B21B 27/06; B21C 37/30
(52) U.S. Cl. ............................................ 72/75; 29/90.01
(58) Field of Search ............................... 72/75; 29/90.01

(56) References Cited

U.S. PATENT DOCUMENTS

| | | | | |
|---|---|---|---|---|
| 2,174,803 A | * | 10/1939 | Mundt et al. ............... | 29/90.01 |
| 2,426,106 A | | 8/1947 | Kinley | |
| 3,457,750 A | * | 7/1969 | Orain ............................ | 72/75 |
| 3,640,115 A | * | 2/1972 | Duncan et al. ............... | 72/393 |
| 3,787,972 A | * | 1/1974 | Carossino ................... | 29/90.01 |
| 5,673,580 A | * | 10/1997 | Ohno ............................. | 72/70 |

FOREIGN PATENT DOCUMENTS

| | | | | |
|---|---|---|---|---|
| DE | 196 40 480 | | 4/1998 | |
| DE | 198 08 807 A | | 9/1998 | |
| DE | 100 01 507 A | | 7/2001 | |
| EP | 0 866 221 | | 9/1998 | |
| GB | 2322920 | * | 9/1998 | ..................... 72/75 |
| IT | 0437789 | * | 5/1949 | ..................... 72/75 |
| JP | 57-41830 | * | 3/1982 | ..................... 72/75 |
| JP | 07 047430 | | 2/1995 | |
| JP | 07 051755 | | 2/1995 | |
| JP | 11 182381 | | 7/1999 | |

\* cited by examiner

*Primary Examiner*—Ed Tolan
(74) *Attorney, Agent, or Firm*—Kenyon & Kenyon

(57) ABSTRACT

A method and an apparatus for edge shaping in a high-pressure fuel reservoir which has an elongated tubular casing element equipped in the longitudinal direction with a continuous recess which forms the interior space of the high-pressure fuel reservoir and is open at at least one end, the recess opening into at least one passthrough orifice, that together with the continuous recess forms a peripheral edge. An elongated actuation element, whose end inserted into the continuous recess is equipped with a surface segment inclined with respect to the longitudinal axis of the continuous recess, is inserted into the continuous recess, the surface segment acting at least indirectly on a pressure element introduced into the continuous recess so that a surface portion of the pressure element is pressed against the peripheral edge, and a smoothing of the edge contour is achieved because of a material displacement in the region of the edge.

16 Claims, 2 Drawing Sheets ated casing-shaped guide element that is insertable into the
METHOD AND DEVICE FOR TREATING EDGES IN A HIGH PRESSURE FUEL ACCUMULATOR This application is a 35 USC 371 of PCT/DE01/01681 filed May 3, 2001.

FIELD OF THE INVENTION

The present invention relates to a method and an apparatus for edge shaping in a high-pressure fuel reservoir.

BACKGROUND INFORMATION

A high-pressure fuel reservoir for a fuel injection system for internal combustion engines is presented, for example, in German Published Patent Application No. 196 40 480. This reference discloses an elongated tubular casing element made of steel which can be connected to a high-pressure fuel pump. The casing element has a continuous recess which extends in the longitudinal direction, constitutes the interior space of the high-pressure fuel reservoir, and is open at at least one end. When the high-pressure fuel reservoir is in the completely installed state, the at least one open end is closed off by the connector of the high-pressure fuel pump or of a pressure-limiting valve, or in another manner. The fuel contained in the high-pressure fuel reservoir and impinged upon by high pressure is delivered, via multiple connectors configured in the casing element and high-pressure lines connected thereto, to electrically controlled injection valves (called "injectors") for injection into the combustion chambers of a compression-ignited internal combustion engine. A high-pressure fuel reservoir of this kind is also called a "common rail." The connectors of the high-pressure fuel reservoir are configured in the form of connector fittings which stand out from the casing element and are each equipped with a passthrough orifice, configured as a bore, that opens into the continuous recess of the casing element. The passthrough orifice forms a peripheral edge with the continuous recess. As a result of the high internal pressure (approximately 1350 bar) in the high-pressure fuel reservoir and because of the narrow diameter (a few millimeters) of the bores, abrasive particles in the fuel cause wear phenomena in the region of the peripheral edge formed by the passthrough orifice and the inner wall of the continuous recess. For this reason, it is desirable to round off or smooth the edge contour. It is known to shape and round off the edge contour using methods such as, for example, honing, in which an abrasive paste is used. These methods are, however, relatively cumbersome and very complex.

SUMMARY OF THE INVENTION

The method according to the present invention makes it possible to greatly reduce the effort necessary for smoothing the edge contour. The method can be performed very economically and inexpensively, and uses a pressure element that is pressed, by an actuation element introduced into the continuous recess, against the peripheral edge in such a way that smoothing of the edge contour is achieved by material displacement in the region of the edge. The modification of the edge contour advantageously contributes to an increase in material strength. As a result, cracks, fractures, and particle detachments occur much less frequently on the rounded edge that has been consolidated with respect to the fuel flow.

It is furthermore advantageous if a guide element, in which the pressure element is mounted movably perpendicularly to the longitudinal axis of the continuous recess, is used to guide the pressure element. Using the guide element, a force acting on the actuation element in the insertion direction of the actuation element is deflected in enhanced fashion perpendicularly to the longitudinal axis of the continuous recess, and acts substantially in that direction on the edge of the high-pressure fuel reservoir that is to be shaped.

Advantageously, the guide element is initially arranged shiftably in the continuous recess, so that upon contact by the pressure element against the peripheral edge, the guide element is shifted in the continuous recess until the pressure element is arranged centeredly with respect to the continuous recess. The guide element can then be immobilized with respect to the high-pressure fuel reservoir, and the edge contour can be shaped by pressure of the pressure element.

It is particularly advantageous if a ball whose diameter is greater than the inside diameter of the passthrough orifice is used as the pressure element. A ball is particularly easy to manufacture with the necessary precision and possesses great mechanical stability, so that a ball is particularly suitable as a pressure element. The spherical shape of the ball surface is particularly suitable for shaping the edge contour.

Any drilling burr that may be present on the edge formed by the continuous recess and the passthrough orifice is advantageously removed before the pressure element is pressed on, since the presence of a drilling burr can greatly impair smoothing of the edge contour. The method described in German Published Patent Application No. 100 01 507, for example, can be used to remove a burr.

Also provided is an apparatus for edge shaping in a high-pressure fuel reservoir which has an elongated tubular casing element that is equipped in the longitudinal direction with a continuous recess which forms the interior space of the high-pressure fuel reservoir and is open at at least one end. The at least one end opens into at least one passthrough orifice, configured as a bore, that with the continuous recess forms a peripheral edge. The apparatus includes: an elongated casing-shaped guide element that is insertable into the continuous recess, having a recess extending in the longitudinal direction of the guide element and an orifice branching off from the recess perpendicularly to the longitudinal direction; a pressure element mounted movably in the orifice; and an actuation element. The actuation element acts with the pressure element and is arranged shiftably in the recess, and is equipped at its end inserted into the recess with a surface segment that is inclined at an angle with respect to the longitudinal direction of the guide element and is in contact against the pressure element. In this context, the pressure element can, by introduction of the actuation element into the guide element, be impinged upon by a force, and consequently push out with a surface portion through the orifice of the guide element in order to shape the edge of the high-pressure fuel reservoir.

Advantageously, the actuation element is arranged in slidingly shiftable fashion in the recess of the guide element, and is of wedge-shaped configuration at its end inserted into the recess.

The orifice in the casing-shaped guide element can be configured simply as a radial bore.

It is particularly advantageous if the pressure element makes contact against the inner wall of the orifice with a slight lateral clearance. This results in accurate guidance of the pressure element. The pressure element can advantageously be configured as a ball. The diameter of the ball is greater than the inside diameter of the passthrough orifice.

DETAILED DESCRIPTION

Figure 1:
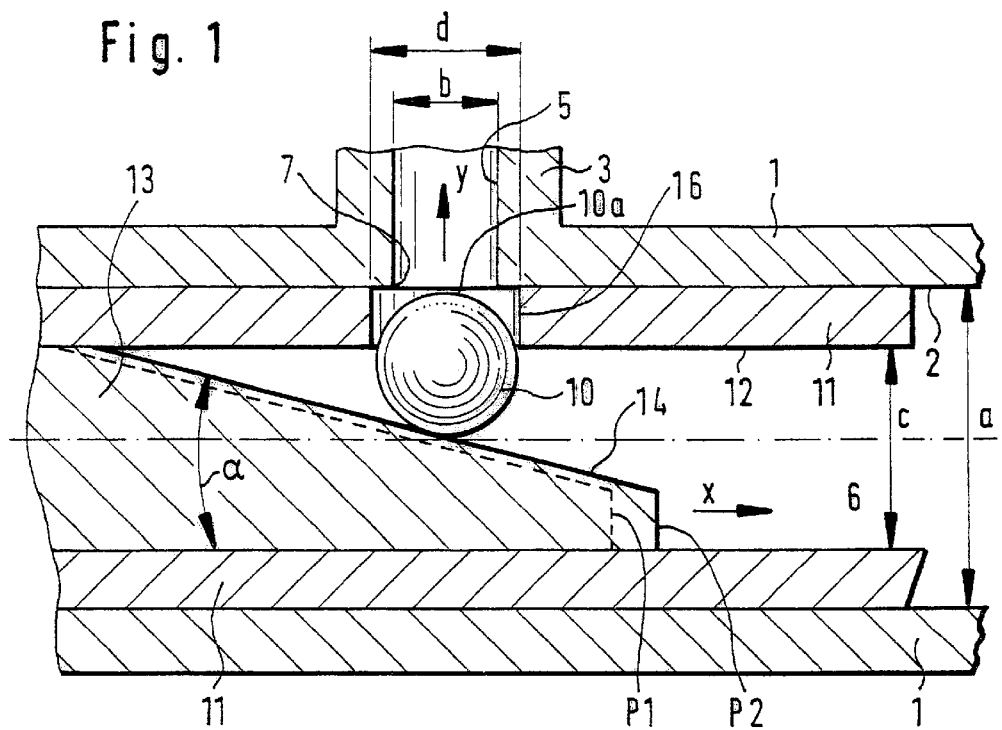
FIG. 1 shows a cross-section, depicted in simplified fashion, through a high-pressure fuel reservoir having connector fittings and an inserted apparatus for edge shaping.

FIG. 1 depicts a cross section through a high-pressure fuel reservoir that encompasses an elongated tubular casing element 1 made of metal which has, in order to supply fuel injection valves, shaped-on connector fittings 3 which are produced, for example, by forging. Further connector fittings 3 which serve to connect to a high-pressure fuel pump or a pressure sensor can, of course, also be provided. The interior space of the high-pressure fuel reservoir is formed by a continuous recess 2, extending in the longitudinal direction of casing element 1, which may have a circular cross section, for example. Continuous recess 2 constituted in casing element 1 can be permanently closed off at one end. The other end is open and can be closed off, for example, with a screwed-on pressure relief valve, the connector to the high-pressure fuel pump, a cover, or in another manner. Continuous recess 2 forms a peripheral edge 7 together with each of passthrough orifices 5.

Any drilling burr that may be present on peripheral edge 7 is first removed before the edge contour of edge 7 is smoothed. This can be done, for example, in the manner described in German Patent Application No. 100 01 507.

Figure 2:
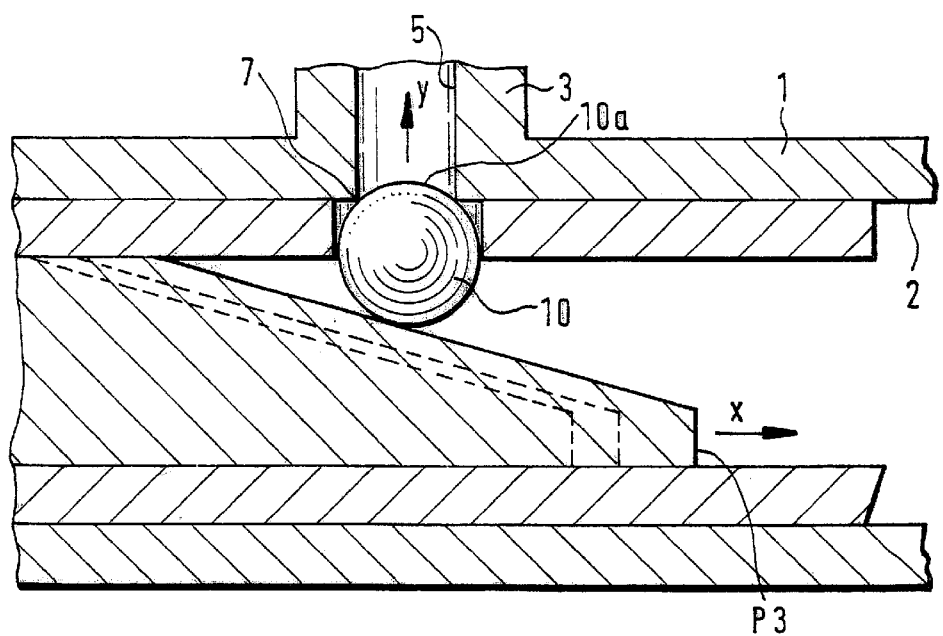
FIG. 2 shows the cross section of FIG. 1 at a later phase of shaping.

As also depicted in FIG. 1, a shaping apparatus is introduced into continuous recess 2 from the open end of the high-pressure fuel reservoir. This apparatus encompasses an elongated, casing-shaped guide element 11. Guide element 11 can, for example, be a tube having a diameter that is somewhat smaller than inside diameter a of the high-pressure fuel reservoir, so that the guide element can be easily introduced into continuous recess 2. In the example shown here, inside diameter a of the high-pressure fuel reservoir is 11 mm. Diameter d of the passthrough orifice is 3.5 mm. The longitudinal axis of guide element 11 coincides with longitudinal axis 6 of the high-pressure fuel reservoir. The guide element has a cylindrical recess 12 with a diameter of 7 mm, extending in the longitudinal direction of the guide element, in which a rod-like actuation element 13 is arranged in slidingly shiftable fashion. The end of actuation element 13 introduced into recess 12 is of wedge-shaped configuration, with a surface segment 14 that is inclined with respect to the longitudinal direction of guide element 11 at an angle α which is less than 45°. In the depicted embodiment, the angle is 15°. In addition, an orifice 16 branches off from recess 12 perpendicularly to the longitudinal axis of guide element 11. Orifice 16 can be created in guide element 11 as, for example, a radial bore. A pressure element configured as ball 10 is mounted in orifice 16 movably in a direction y perpendicular to the longitudinal direction of guide element 11. The diameter of the ball is selected to be slightly smaller than the inside diameter of orifice 16, so that the ball is guided by the inner wall of orifice 16 with a slight lateral clearance. In the exemplary embodiment shown here, the diameter of ball 10 is approximately 5 mm. The ball is produced from a particularly hard material that is harder than the material of the high-pressure fuel reservoir. Ball 10 cooperates with inclined surface segment 14 of actuation element 13 as depicted in FIGS. 1 through 3.

Upon insertion of guide element 11, actuation element 12 is initially in the position indicated with dashed lines as P1 in FIG. 1. Ball 10 rests against the inner wall of orifice 16 and against inclined surface segment 14 of actuation element 13. In position P1, a surface portion 10a of the ball located opposite inclined surface segment 14 is arranged in recessed fashion (not depicted) inside orifice 16, so that the apparatus can be introduced without difficulty into continuous recess 2. Guide element 11 is brought into a position in which orifice 16 is arranged approximately coaxially with passthrough orifice 5 of the high-pressure fuel reservoir.

Actuation element 13 is inserted in direction x farther into recess 12, to position P2. One end (not depicted) of actuation element 13 that protrudes from the guide device serves as a handle during insertion of actuation element 13. As actuation element 13 is inserted, ball 10 slides along inclined surface segment 14 and is moved in direction y in orifice 16, perpendicularly to the longitudinal direction of guide element 11, into the position depicted in FIG. 1. Further insertion of actuation element 13 over a distance of a few millimeters, into position P3 shown in FIG. 2, causes the ball to be moved farther in the y direction along the inner wall of orifice 16 until a segment of the ball projects out of orifice 16 and, at surface portion 10a, comes into contact against edge 7 of the high-pressure fuel reservoir. As soon as the first contact with edge 7 is made, a further advance of ball in the y direction results in a shifting of guide element 11 (which in this phase is freely movable and slidingly shiftable) in continuous recess 2, until ball 10 is in contact against two opposite points of peripheral edge 7 and is centered with respect to passthrough orifice 5. Guide element 11 can then be immobilized so that it cannot be shifted further by ball 10 in its position relative to high-pressure fuel reservoir 1.

Figure 3:
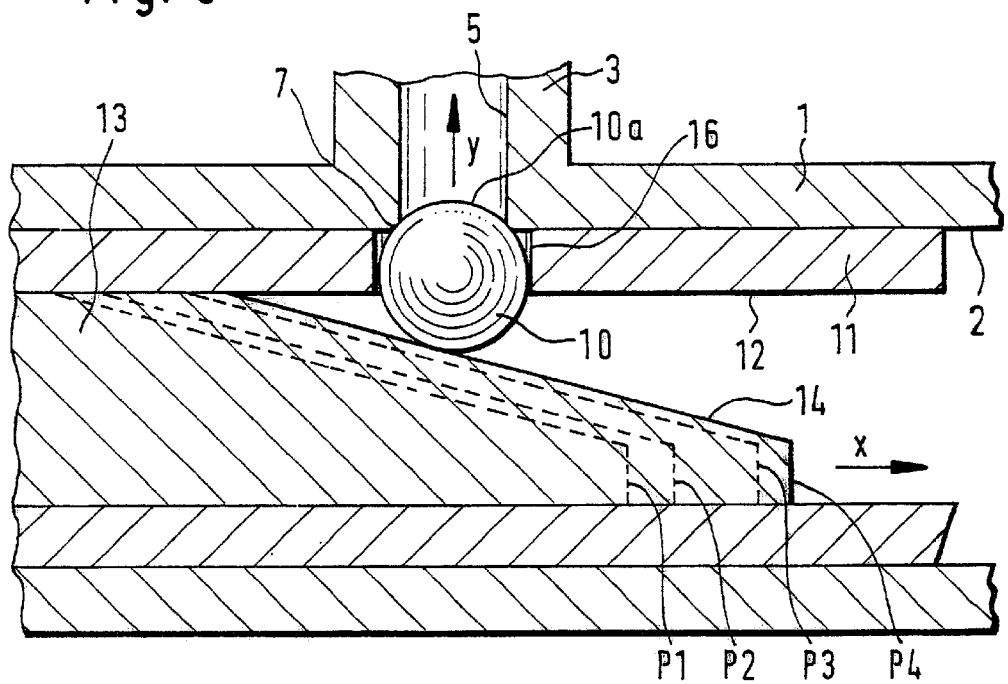
FIG. 3 shows the cross section of FIG. 1 as the ball presses against a peripheral edge of the high-pressure fuel reservoir.

The next step is shown in FIG. 3. Pressure on actuation element 13 causes the latter to move into position P4. In this example, the entire displacement travel from position P1 to position P4 is only approximately 5 mm. Ball 10 is moved farther in direction y. Because of the inner wall of orifice 16 of guide element 11, the force transferred from inclined surface segment 14 to ball 10 is deflected substantially into the y direction, since the force components perpendicular to the y direction are compensated for by the immobilized guide element 11. In principle, however, it is also possible to perform the method without guide element 11 and to use only actuation element 13 and ball 10, since the actuation element and ball can in a certain respect be wedged in continuous recess 2 when the ball is in contact against edge 7. The use of a guide element is advantageous, however, since it not only greatly facilitates handling but also can optimize the application of force onto edge 7.

Figure 4A:
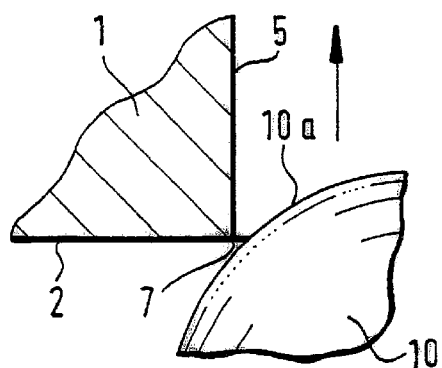
FIGS. 4a and 4b show enlarged detail views of the edge contour during shaping with the pressure element.
Figure 4B:
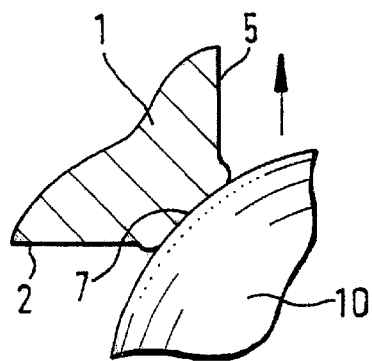

As ball 10 is pressed against edge 7, material displacement causes the edge contour to be modified. This is depicted in enlarged fashion in FIGS. 4a and 4b. The manner in which edge 7 is smoothed or rounded off by the pressure of ball 10 and the resulting material displacement is evident from FIG. 4b.

Peripheral edge 7 formed by the cylindrical continuous recess 2 and cylindrical passthrough orifice 5 does not lie in one plane, and is curved in three dimensions. As ball 10 is pressed on, it therefore initially comes into contact only at two opposite points on peripheral edge 7. With further pressure, ball 10 also comes into contact at additional points on the peripheral edge, so that these also can be shaped. A consequence of this is that not all points on the edge contour are uniformly shaped, since the ball is pressed more strongly into the edge at those points where it comes into contact first than at those points where it comes into contact last. Satisfactory smoothing over the entire extent of the edge can nevertheless be achieved with the method set forth above.

What is claimed is:

1. A method for edge shaping in a high-pressure fuel reservoir, the fuel reservoir including an elongated tubular casing element having a longitudinal continuous recess, the continuous recess forming the interior space of the high-pressure fuel reservoir and being open at at least one end, the continuous recess being coupled to and forming a peripheral edge with at least one passthrough bore orifice, the method comprising:

inserting an elongated actuation element into the continuous recess, the elongated actuation element having an end with a surface segment inclined with respect to a longitudinal axis of the continuous recess;

introducing a pressure element having a surface portion into the continuous recess, the pressure element cooperating with the surface segment of the elongated actuation element;

pressing the surface portion of the pressure element against the peripheral edge; and displacing material in a region of the peripheral edge by a pressure of the pressure element to provide a smoothing of an edge contour.

2. The method of claim 1, further comprising:

mounting the pressure element movably in a direction perpendicular to the longitudinal axis of the continuous recess using a guide element.

3. The method of claim 2, further comprising:

deflecting a force acting on the actuation element in the longitudinal direction perpendicularly to the longitudinal axis of the continuous recess by combined action of the inclined surface segment, the pressure element, and the guide element, the deflected force acting substantially in the perpendicular direction on the peripheral edge.

4. The method of claim 2, further comprising:

centering the pressure element with respect to the passthrough orifice by a shifting of the guide element in the continuous recess upon contact of the pressure element against the peripheral edge.

5. The method of claim 4, further comprising:

after centering of the pressure element, immobilizing the shiftable guide element.

6. The method of claim 1, wherein the pressure element constitutes a ball having a diameter greater than an inside diameter of the passthrough orifice of the high-pressure fuel reservoir.

7. The method of claim 1, further comprising:

removing any drilling burr on the peripheral edge before application of the pressure element.

8. An apparatus for edge shaping in a high-pressure fuel reservoir, the fuel reservoir including an elongated tubular casing element having an outer surface and a longitudinal continuous recess, the continuous recess forming the interior space of the high-pressure fuel reservoir and being open at at least one end, the continuous recess being coupled to and forming a peripheral edge with at least one passthrough bore orifice, the apparatus comprising:

an elongated casing-shaped guide element insertable into the continuous recess, having a recess extending in a longitudinal direction of the guide element and an orifice branching off from the recess perpendicularly to the longitudinal direction;

a pressure element having a surface portion, the pressure element being mounted movably in the orifice of the guide element; and an actuation element situated shiftably in the recess of the guide element, the actuation element having an end with a surface segment inclined at an angle with respect to the longitudinal direction of the guide element that is inserted into the recess into contact with the pressure element;

wherein introduction of the actuation element forces the surface portion of the pressure element through the orifice of the guide element in order to shape the peripheral edge without deforming the outer surface of the tubular casing element.

9. The apparatus of claim 8, wherein the actuation element is arranged to slidingly shift in the recess of the guide element.

10. The apparatus of claim 8, wherein the end of the actuation element inserted into the recess of the guide element has a wedge-shaped configuration.

11. The apparatus of claim 8, wherein the orifice is configured as a bore having an inner wall.

12. The apparatus of claim 11, wherein the pressure element makes contact against the inner wall of the orifice with a slight lateral clearance.

13. The apparatus of claim 8, wherein the pressure element is configured as a ball.

14. The apparatus of claim 13, wherein the diameter of the ball is greater than an inside diameter of the passthrough orifice.

15. An apparatus for edge shaping in a high-pressure fuel reservoir, the fuel reservoir including an elongated tubular casing element having a longitudinal continuous recess, the continuous recess forming the interior space of the high-pressure fuel reservoir and being open at at least one end, the continuous recess being coupled to and forming a peripheral edge with at least one passthrough bore orifice, the apparatus comprising:

an elongated casing-shaped guide element insertable into the continuous recess and substantially conforming to the continuous recess, having a recess extending in a longitudinal direction of the guide element and an orifice branching off from the recess perpendicularly to the longitudinal direction; and a shaping means for smoothing the peripheral edge.

16. The apparatus of claim 15, wherein the shaping means includes a pressure element having a surface portion, the pressure element being mounted movably in the orifice of the guide element; and an actuation element situated shiftably in the recess of the guide element, the actuation element having an end with a surface segment inclined at an angle with respect to the longitudinal direction of the guide element that is inserted into the recess into contact with the pressure element;

wherein introduction of the actuation element forces the surface portion of the pressure element through the orifice of the guide element in order to smooth the peripheral edge.

* * * * *